(12) United States Patent
Arakawa et al.

(10) Patent No.: US 11,114,242 B2
(45) Date of Patent: Sep. 7, 2021

(54) CAPACITOR HAVING AN OXIDE FILM ON A SURFACE OF A CONDUCTIVE METAL BASE MATERIAL

(71) Applicant: Murata Manufacturing Co., Ltd., Nagaokakyo (JP)

(72) Inventors: Takeo Arakawa, Nagaokakyo (JP); Hiromasa Saeki, Nagaokakyo (JP)

(73) Assignee: MURATA MANUFACTURING CO., LTD., Nagaokakyo (JP)

( * ) Notice: Subject to any disclaimer, the term of this patent is extended or adjusted under 35 U.S.C. 154(b) by 0 days.

(21) Appl. No.: 16/571,401

(22) Filed: Sep. 16, 2019

(65) Prior Publication Data

US 2020/0013552 A1 Jan. 9, 2020

Related U.S. Application Data

(63) Continuation of application No. PCT/JP2018/011303, filed on Mar. 22, 2018.

(30) Foreign Application Priority Data

Mar. 24, 2017 (JP) .............................. JP2017-059822

(51) Int. Cl.
*H01G 4/33* (2006.01)
*H01G 4/10* (2006.01)
*H01G 4/005* (2006.01)

(52) U.S. Cl.
CPC ............... *H01G 4/10* (2013.01); *H01G 4/005* (2013.01); *H01G 4/33* (2013.01)

(58) Field of Classification Search
CPC ............. H01G 4/10; H01G 4/005; H01G 4/33
See application file for complete search history.

(56) References Cited

U.S. PATENT DOCUMENTS

| 6,914,770 B1 * | 7/2005 | Goldberger ............ H01G 9/012 361/524 |
| 8,451,582 B2 | 5/2013 | Sneh et al. |
| 10,256,045 B2 | 4/2019 | Saeki et al. |

(Continued)

FOREIGN PATENT DOCUMENTS

| JP | 2008507847 A | 3/2008 |
| WO | 2015118902 A1 | 8/2015 |

(Continued)

OTHER PUBLICATIONS

International Search Report issued in PCT/JP2018/011303, dated Jun. 12, 2018.

(Continued)

*Primary Examiner* — David M Sinclair
(74) *Attorney, Agent, or Firm* — Arent Fox LLP

(57) ABSTRACT

A capacitor including a conductive metal base material having a porous part, a dielectric layer on the porous part, an upper electrode on the dielectric layer, and an oxide film on a surface of the conductive metal base material. The oxide film on the surface of the metal base material operates as an insulating layer between a lower electrode and an upper electrode, and the metal base material and the oxide film are preferably integrated so that separation of the insulating layer can be prevented, and a short circuit between the lower electrode and the upper electrode can be suppressed.

18 Claims, 10 Drawing Sheets

(56) References Cited

U.S. PATENT DOCUMENTS

| | | |
|---|---|---|
| 2008/0094775 A1 | 4/2008 | Sneh et al. |
| 2009/0122460 A1* | 5/2009 | Gschwandtner ....... H01G 4/008 361/305 |
| 2010/0123993 A1* | 5/2010 | Laor .................... B01J 37/0238 361/303 |
| 2011/0310526 A1 | 12/2011 | Sneh et al. |
| 2012/0099242 A1* | 4/2012 | Ohyama .................. H01G 9/15 361/303 |
| 2016/0322171 A1 | 11/2016 | Saeki et al. |
| 2016/0329158 A1* | 11/2016 | Hattori ................... H01G 9/012 |
| 2018/0047517 A1 | 2/2018 | Kanryo et al. |

FOREIGN PATENT DOCUMENTS

| | | | | |
|---|---|---|---|---|
| WO | WO-2015118901 A1 * | 8/2015 | ............... | H01G 9/04 |
| WO | 2016181865 A1 | 11/2016 | | |

OTHER PUBLICATIONS

Written Opinion of the International Searching Authority issued in PCT/JP2018/011303, dated Jun. 12, 2018.

\* cited by examiner

CAPACITOR HAVING AN OXIDE FILM ON A SURFACE OF A CONDUCTIVE METAL BASE MATERIAL

CROSS REFERENCE TO RELATED APPLICATIONS

The present application is a continuation of International application No. PCT/JP2018/011303, filed Mar. 22, 2018, which claims priority to Japanese Patent Application No. 2017-059822, filed Mar. 24, 2017, the entire contents of each of which are incorporated herein by reference.

FIELD OF THE INVENTION

The present invention relates to a capacitor.

BACKGROUND OF THE INVENTION

In recent years, with higher-density mounting of electronic devices, capacitors with higher electrostatic capacitance have been desired. In order to obtain high electrostatic capacitance, the area of an electrostatic capacitance forming part is increased and the thickness of a dielectric layer is reduced. In such a capacitor, since the dielectric layer is thin, a short circuit may occur between an upper electrode and a lower electrode at an end of the capacitor. In particular, in a case where the capacitor is manufactured as a collective board and divided into individual elements, due to the cutting for the division, the upper electrode and the lower electrode are stretched in the cutting direction, and the above-mentioned short circuit tends to occur.

In Patent Document 1, in order to prevent the above-mentioned short circuit, in a capacitor including a conductive metal base material as a lower electrode, a dielectric layer located on the conductive metal base material, and an upper electrode located on the dielectric layer, a resin layer as an insulating part is provided at an end of the capacitor between the lower electrode and the upper electrode. Patent Document 1 discloses that providing the resin layer can suppress a short circuit between the lower electrode and the upper electrode.

Patent Document 1: International Publication No. WO 2016/181865

SUMMARY OF THE INVENTION

Providing the resin layer between the lower electrode and the upper electrode as in Patent Document 1 can suppress a short circuit between the lower electrode and the upper electrode. The resin layer, however, is low in adhesion to the lower electrode, the upper electrode, and the dielectric layer, and may be inconveniently separated at the time the capacitor manufactured as a collective board is cut into individual elements.

An object of the present invention is to provide a capacitor that is less susceptible to a short circuit between the lower electrode and the upper electrode as well as layer separation.

As a result of intensive studies to solve the above-mentioned problem, the present inventors have found that the use of an oxide film, which is formed on a surface of a metal base material serving as a lower electrode, as the insulating layer between the lower electrode and the upper electrode, the metal base material and the oxide film are integrated, and as a result, the separation of the insulating layer can be prevented, and a short circuit between the lower electrode and the upper electrode can be further suppressed. Thus, the present inventors completed the present invention.

According to the present invention, the capacitor includes an oxide film is on a surface of a metal base material, a dielectric layer is on the oxide film, and an upper electrode is on the dielectric layer. With such a structure, a short circuit between the lower electrode and the upper electrode can be suppressed.

BRIEF EXPLANATION OF THE DRAWINGS

FIG. 3(a) is a schematic perspective view of a collective board, and FIG. 3(b) is a schematic cross-sectional view taken along the line x-x.

FIG. 4(a) is a schematic perspective view of the collective board, and FIG. 4(b) is a schematic cross-sectional view taken along the line x-x.

FIG. 5(a) is a schematic perspective view of the collective board, and FIG. 5(b) is a schematic cross-sectional view taken along the line x-x.

FIG. 6(a) is a schematic perspective view of the collective board, and FIG. 6(b) is a schematic cross-sectional view taken along the line x-x.

FIG. 7(a) is a schematic perspective view of the collective board, and FIG. 7(b) is a schematic cross-sectional view taken along the line x-x.

FIG. 8(a) is a schematic perspective view of the collective board, and FIG. 8(b) is a schematic cross-sectional view taken along the line x-x.

FIG. 9(a) is a schematic perspective view of the collective board, and FIG. 9(b) is a schematic cross-sectional view taken along the line x-x.

DETAILED DESCRIPTION OF THE INVENTION

Figure 1A:
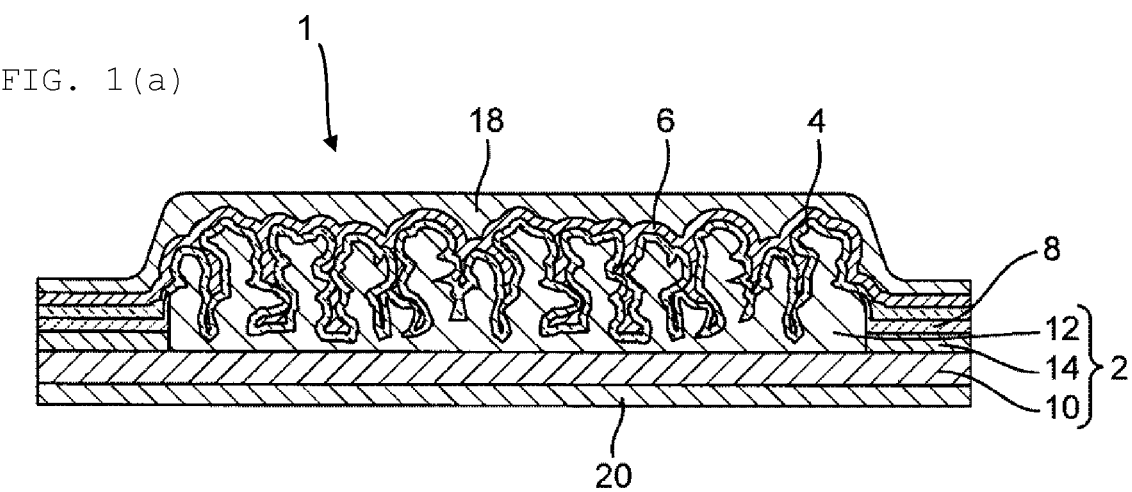
FIG. 1(a) is a schematic cross-sectional view of a capacitor 1 according to one embodiment of the present invention.

A capacitor according to the present invention will be described in detail below with reference to the drawings. However, the capacitor according to the present embodiment as well as the shapes and arrangement of constituent elements are not limited to the examples shown in the drawings.

Figure 1B:
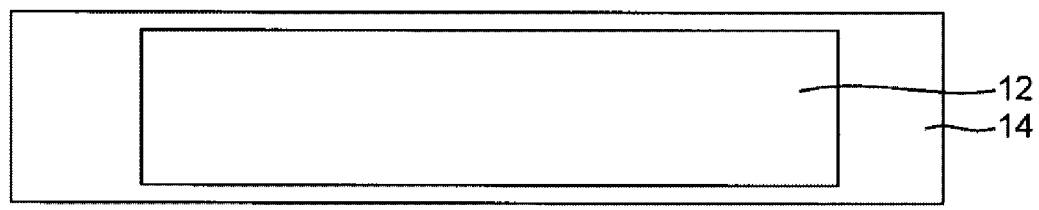
FIG. 1(b) is a schematic plan view of a conductive metal substrate of the capacitor 1.
Figure 2A:
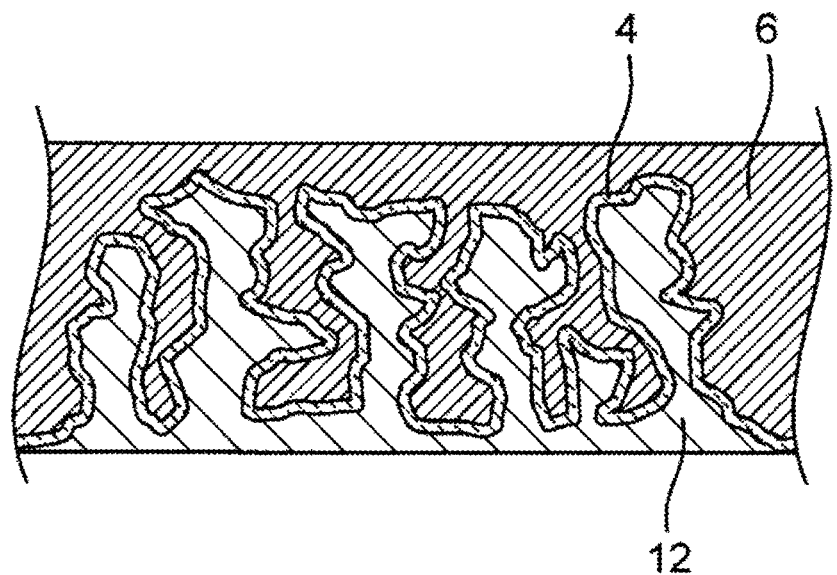
FIG. 2(a) is an enlarged view of a high-porosity part of the capacitor in FIG. 1(a)
Figure 2B:
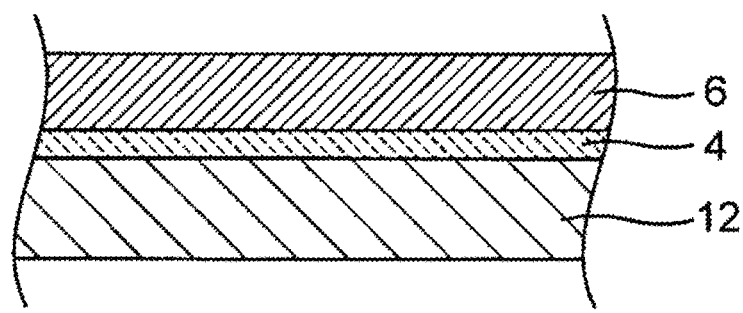
FIG. 2(b) is a diagram schematically illustrating a layer structure at the high-porosity part.

FIG. 1(a) shows a schematic cross-sectional view of a capacitor 1 according to the present embodiment, and FIG. 1(b) shows a schematic plan view of a conductive metal base material 2. In addition, FIG. 2(a) shows an enlarged schematic cross-sectional view of a high-porosity part 12 in the conductive metal base material 2, and FIG. 2(b) schematically shows a layer structure of the high-porosity part 12, a dielectric layer 4, and an upper electrode 6.

As shown in FIGS. 1(*a*), 1(*b*), 2(*a*), and 2(*b*), the capacitor 1 according to the present embodiment has a substantially rectangular parallelepiped shape, and basically has the conductive metal base material 2, the dielectric layer 4 on the conductive metal base material 2, and the upper electrode 6 on the dielectric layer 4. The conductive metal base material 2 has, on one principal surface side thereof, the high-porosity part 12 that has relatively high porosity, and a low-porosity part 14 that has relatively low porosity. The high-porosity part 12 is located at the center of the one principal surface of the conductive metal base material 2, and the low-porosity part 14 is located around the high-porosity part 12. More specifically, the low-porosity part 14 is located to surround the high-porosity part 12. The high-porosity part 12 has a porous structure, and corresponds to a porous part according to the present invention. In addition, the conductive metal base material 2 has a support part 10 on the other principal surface side thereof. More specifically, the high-porosity part 12 and the low-porosity part 14 together form a first surface of the conductive metal base material 2, whereas the support part 10 forms a second surface of the conductive metal base material 2. The first surface is also referred to as one principal surface or a first principal surface, and the second surface is also referred to as the other principal surface or a second principal surface. In FIG. 1(*a*), the first surface is an upper surface of the conductive metal base material 2, whereas the second surface is a lower surface of the conductive metal base material 2. An oxide film 8 is formed on a surface of the conductive metal base material 2 at an end of the capacitor 1. The capacitor 1 includes a first external electrode 18 on the upper electrode 6, and a second external electrode 20 on the support part 10 in the conductive metal base material 2. In the capacitor 1 according to the present embodiment, the first external electrode 18 is electrically connected to the upper electrode 6, and the second external electrode 20 is electrically connected to the conductive metal base material 2. The upper electrode 6 and the high-porosity part 12 in the conductive metal base material 2 are opposed to each other with the dielectric layer 4 interposed therebetween to form an electrostatic capacitance forming part, and application of a current to the upper electrode 6 and the conductive metal base material 2 can accumulate charges in the dielectric layer 4.

The material that constitutes the conductive metal base material 2 is not particularly limited as long as it is a metal capable of forming an oxide film. Examples of the material that constitutes the conductive metal base material 2 include valve metals such as aluminum, tantalum, titanium, niobium, zirconium, and tungsten, and alloys of any of these metals. The material that constitutes the conductive metal base material 2 is preferably aluminum.

The conductive metal base material 2 has the high-porosity part 12 and the low-porosity part 14 on one principal surface side thereof, and the support part 10 on the other principal surface side thereof.

As used herein, the term "porosity" refers to the proportion of voids in the conductive metal base material. The porosity can be measured in the following manner. It is to be noted that while voids in the porous part may be finally filled with the dielectric layer, the upper electrode, and the like in the process of producing the capacitor, the "porosity" is calculated with the filled sites also regarded as voids without considering the filling substances.

First, the conductive metal base material is processed by focused ion beam (FIB) processing into a thin section having a thickness of 60 nm or less. A predetermined region (3 µm×3 µm) of the thin section sample is photographed with use of a transmission electron microscope (TEM). The obtained image is subjected to image analysis to determine the area where any metal is present in the conductive metal base material. Then, the porosity can be calculated from the following equation.

$$\text{Porosity} = ((\text{measured area} - \text{area where metal is present in base material})/\text{measured area}) \times 100$$

As used herein, the term "high-porosity part" refers to a part that has higher porosity than the support part and/or the low-porosity part in the conductive metal base material.

The high-porosity part 12 has a porous structure. The high-porosity part 12 having a porous structure increases the specific surface area of the conductive metal base material, and consequently increases the electrostatic capacitance of the capacitor.

The porosity of the high-porosity part may be preferably 20% or more, more preferably 30% or more, still more preferably 35% or more from the viewpoint of increasing the specific surface area to increase the electrostatic capacitance of the capacitor. Meanwhile, the porosity is preferably 90% or less, more preferably 80% or less from the viewpoint of ensuring the mechanical strength.

The high-porosity part preferably has a surface expansion ratio of 30 times to 10,000 times, more preferably 50 times to 5,000 times, for example, 300 times to 600 times, although the surface expansion ratio is not particularly limited. Herein, the surface expansion ratio refers to the surface area per unit projected area. The surface area per unit projected area can be determined from the amount of nitrogen adsorption at a liquid nitrogen temperature with use of a BET specific surface area measurement device.

As used herein, the term "low-porosity part" refers to a part that has lower porosity than the high-porosity part. Preferably, the porosity of the low-porosity part is lower than the porosity of the high-porosity part and equal to or more than the porosity of the support part.

The porosity of the low-porosity part is preferably 20% or less, more preferably 10% or less. The low-porosity part may have a porosity of 0%. More specifically, the low-porosity part may or may not have a porous structure. The lower the porosity of the low-porosity part, the more the mechanical strength of the capacitor is improved.

It is to be noted that the low-porosity part is not an essential constituent element in the present invention, and does not have to be necessarily present. For example, in FIG. 1(*a*), the support part 10 may be exposed at an upper side without the low-porosity part 14.

In the present embodiment, the conductive metal base material 2 has the high-porosity part located at one principal surface side thereof and the low-porosity part present around the high-porosity part, but the present invention is not limited thereto. More specifically, the location, number, size, and shape of the high-porosity part and the low-porosity part, the ratio between both the parts, and the like are not particularly limited. For example, the conductive metal base material may have one principal surface composed only of the high-porosity part. Moreover, the high-porosity part may be present at both the principal surfaces of the conductive metal base material. In addition, adjustment of the ratio between the high-porosity part and the low-porosity part enables control of the electrostatic capacitance of the capacitor.

The thickness of the high-porosity part 12 is not particularly limited and can be selected appropriately according to the purpose, and may be, for example, 10 μm to 1000 μm, preferably 30 μm or more, and 300 μm or less, preferably 150 μm or less, more preferably 80 μm or less, still more preferably 40 μm or less.

The porosity of the support part 10 in the conductive metal base material 2 is preferably smaller in order to fulfill the function as a support. More specifically, the porosity is preferably 10% or less, and it is more preferable that the support part 10 have substantially no voids.

The thickness of the support part 10 is not particularly limited, but is preferably 10 μm or more in order to increase the mechanical strength of the capacitor, and may be, for example, 100 μm or more or 500 μm or more. Meanwhile, from the viewpoint of achieving a lower-profile capacitor, the thickness is preferably 1000 μm or less, and may be, for example, 500 μm or less, preferably 100 μm or less, more preferably 50 μm or less, still more preferably 30 μm or less.

The thickness of the conductive metal base material 2 is not particularly limited and can be selected appropriately according to the purpose, and is, for example, 1000 μm or less, 500 μm or less, or 200 μm or less, preferably 80 μm or less, still more preferably 40 μm or less, and is preferably 30 μm or more.

The method for manufacturing the conductive metal base material 2 is not particularly limited. For example, the conductive metal base material 2 can be manufactured by treating an appropriate metal material in accordance with a method of forming a porous structure, a method of collapsing (filling) a porous structure, a method of removing a porous structure part, or a combination thereof.

In the capacitor 1 according to the present embodiment, the oxide film 8 is formed on the low-porosity part 14, that is, on an end of the conductive metal base material 2.

Herein, the "end" means a region continuous from an edge of a principal surface of the conductive metal base material.

The end may be a region that preferably occupies 1% to 30%, more preferably 5% to 20%, still more preferably 5% to 15% of the distance between a pair of sides opposed to each other. The end may be a region that preferably occupies 3 μm or more, more preferably 5 μm or more, still more preferably 10 μm or more of the distance from an edge of a principal surface.

The material that constitutes the oxide film 8 is an oxide of the material that constitutes the conductive metal base material 2. Examples of the material that constitutes the oxide film 8 include $AlO_x$ (for example, $Al_2O_3$), $TaO_x$, $TiO_x$, $NbO_x$, $ZrO_x$, $WO_x$, $AlTiO_x$, $TiZrO_x$, and $TiZrWO_x$. The material that constitutes the oxide film 8 is preferably $AlO_x$ (for example, $Al_2O_3$). It is to be noted that the formulae are merely intended to represent the constitutions of the materials and are not intended to limit the compositions. That is, subscript x attached to O may have any value larger than 0.

The thickness of the oxide film 8 is not particularly limited, but may be preferably 8 μm or more, more preferably 10 μm or more, still more preferably 15 μm or more from the viewpoint of more reliably preventing a short circuit between the lower electrode and the upper electrode and preventing end surface discharge. Meanwhile, from the viewpoint of achieving a lower-profile capacitor, the thickness is preferably 100 μm or less, and may be, for example, 50 μm or less, preferably 30 μm or less, more preferably 20 μm or less. It is to be noted that the thickness of the oxide film means the minimum thickness of the oxide film.

It is to be noted that the site where the oxide film 8 is formed is not particularly limited as long as it is on the conductive metal base material 2. The oxide film is preferably formed at least on an end of the conductive metal base material. Forming the oxide film on an end of the conductive metal base material can suppress a short circuit at an end surface or a short circuit due to end surface discharge. The oxide film is preferably formed also on a wall of a groove. Forming the oxide film on a wall of a groove improves the mechanical strength of the capacitor. The oxide film is more preferably formed on an end as well as a wall of a groove of the conductive metal base material.

The oxide film 8 is preferably an anodized film. An anodized film serving as the oxide film is a dense and uniform film. For example, in the oxide film in the capacitor according to the present invention, a difference between the maximum film thickness and the minimum film thickness may be preferably 5 μm or less, more preferably 3 μm or less, still more preferably 1 μm or less.

Since the oxide film is formed by oxidation of a surface of the conductive metal base material, the oxide film and the conductive metal base material are substantially integrated and are less susceptible to separation from each other. In addition, since the conductive metal base material can be oxidized by batch treatment, formation of the oxide film is advantageous in that it is high in throughput.

In the capacitor 1 according to the present embodiment, the dielectric layer 4 is formed on the high-porosity part 12 and the oxide film 8.

The dielectric layer 4 preferably contains a substance having a source different from a source of the conductive metal base material. That is, the dielectric layer 4 is preferably a layer other than the oxide film formed on a surface of the conductive metal base material.

The material that forms the dielectric layer 4 is not particularly limited as long as it is insulative, and preferable examples thereof include metal oxides such as $AlO_x$ (for example, $Al_2O_3$), $SiO_x$ (for example, $SiO_2$), $AlTiO_x$, $SiTiO_x$, $HfO_x$, $TaO_x$, $ZrO_x$, $HfSiO_x$, $ZrSiO_x$, $TiZrO_x$, $TiZrWO_x$, $TiO_x$, $SrTiO_x$, $PbTiO_x$, $BaTiO_x$, $BaSrTiO_x$, $BaCaTiO_x$, and $SiAlO_x$; metal nitrides such as $AlN_x$, $SiN_x$, and $AlScN_x$; and metal oxynitrides such as $AlO_xN_y$, $SiO_xN_y$, $HfSiO_xN_y$, and $SiC_xO_yN_z$, with $AlO_x$, $SiO_x$, $SiO_xN_y$, and $HfSiO_x$ being preferable. It is to be noted that the formulae are merely intended to represent the constitutions of the materials and are not intended to limit the compositions. That is, subscripts x, y, and z attached to O and N may have any value larger than 0, and the abundance ratio among the elements including metal elements is arbitrary.

The thickness of the dielectric layer 4 is not particularly limited, but is, for example, preferably 5 nm or more and 100 nm or less, more preferably 10 nm or more and 50 nm or less. A dielectric layer having a thickness of 5 nm or more can improve the insulating property, and can thus reduce the leakage current. Meanwhile, a dielectric layer having a thickness of 100 nm or less makes it possible to achieve higher electrostatic capacitance.

The dielectric layer 4 is preferably formed by a gas-phase method, for example, a vacuum vapor deposition method, a chemical vapor deposition (CVD) method, a sputtering method, an atomic layer deposition (ALD) method, or a pulsed laser deposition method (PLD). The ALD method is more preferable because the ALD method can form a more homogeneous and denser film even in microscopic regions of pores of a porous member.

In the capacitor 1 according to the present embodiment, the upper electrode 6 is formed on the dielectric layer 4.

The material that constitutes the upper electrode 6 is not particularly limited as long as it is conductive, and preferable examples thereof include Ni, Cu, Al, W, Ti, Ag, Au, Pt, Zn, Sn, Pb, Fe, Cr, Mo, Ru, Pd, Ta, and alloys of any of these metals, for example, CuNi, AuNi, and AuSn; metal nitrides and metal oxynitrides such as TiN, TiAlN, TiON, TiAlON, and TaN; and conductive polymers (for example, PEDOT (poly(3,4-ethylenedioxythiophene)), polypyrrole, and polyaniline), with TiN and TiON being preferable.

The thickness of the upper electrode 6 is not particularly limited, but is, for example, preferably 3 nm or more, more preferably 10 nm or more. An upper electrode having a thickness of 3 nm or more can have lower resistance by itself.

The upper electrode 6 may be formed by an ALD method. Use of the ALD method can increase the electrostatic capacitance of the capacitor. Alternatively, the upper electrode may be formed by a method such as a chemical vapor deposition (CVD) method, plating, bias sputtering, a sol-gel method, or conductive polymer filling, which can cover the dielectric layer and substantially fill the pores of the conductive metal base material. The upper electrode may be preferably formed by forming a conductive film by the ALD method on the dielectric layer, and filling the pores from above the conductive film by another technique with a conductive substance, preferably a substance that has lower electric resistance than the conductive film does. This constitution can efficiently achieve higher electrostatic capacitance density and low equivalent series resistance (ESR).

It is to be noted that if the formed upper electrode fails to have sufficient conductivity as a capacitor electrode, an extraction electrode layer of Al, Cu, Ni, or the like may be additionally formed on a surface of the upper electrode by a method such as a sputtering method, vapor deposition, or plating.

According to the present embodiment, the first external electrode 18 is formed on the upper electrode 6.

According to the present embodiment, the second external electrode 20 is formed on a principal surface of the conductive metal base material 2 on a support part 10 side thereof.

The material that constitutes the first and second external electrodes 18 and 20 is not particularly limited, and examples thereof include metals such as Au, Pb, Ag, Sn, Ni, Cu, and Pd and alloys of any of these metals, and conductive polymers.

In consideration of adhesion, solderability, solder leaching, conductivity, wire bondability, laser resistance, and the like, the material that constitutes the first and second external electrodes 18 and 20 is preferably Cu, Ti/Al, Ni/Au, Ti/Cu, Cu/Ni/Au, Ni/Sn, or Cu/Ni/Sn (herein, for example, "Ti/Al" means that an Al film is formed on a formed Ti film) when the material that constitutes the conductive metal base material 2 is aluminum.

The method for forming the external electrodes 18 and 20 is not particularly limited, but may be, for example, a CVD method, electrolytic plating, electroless plating, vapor deposition, a sputtering method, or conductive paste baking, with electrolytic plating, electroless plating, vapor deposition, a sputtering method, and the like being preferable.

It is to be noted that the first external electrode 18 and the second external electrode 20 are disposed on the entire upper surface and the entire lower surface of the capacitor, respectively, but the disposition is not limited thereto, and the first external electrode 18 and the second external electrode 20 in any shape and any size can be disposed only on part of the respective surfaces. In addition, the first external electrode 18 and the second external electrode 20 are not essential elements, and do not have to be necessarily present. In this case, the upper electrode 6 serves also as the first external electrode, and the support part 10 serves also as the second external electrode. More specifically, the upper electrode 6 and the support part 10 may serve as a pair of electrodes. In this case, the upper electrode 6 may serve as an anode, and the support part 10 may serve as a cathode. Alternatively, the upper electrode 6 may serve as a cathode, and the support part 10 may serve as an anode.

According to the present embodiment, the capacitor 1 has a substantially rectangular parallelepiped shape, but the present invention is not limited to the shape. The capacitor according to the present invention can have any shape, and, for example, the shape of the capacitor in plan view may be a circular shape, an elliptical shape, or a quadrangular shape with round corners.

While the capacitor 1 according to the present embodiment has been described above, various modifications can be made on the capacitor according to the present invention.

Figure 10:
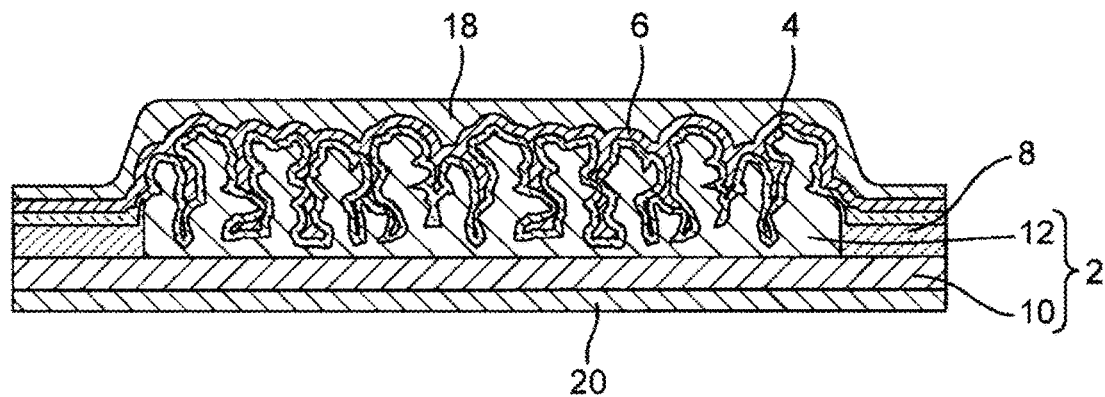
FIG. 10 is a schematic cross-sectional view of a capacitor according to another embodiment of the present invention.

For example, in another aspect, the capacitor according to the present invention does not have to have a low-porosity part. As shown in FIG. 10, in a capacitor 1, a support part 10 may be exposed at an upper surface of a conductive metal base material without a low-porosity part 14 present on the support part 10. In this case, an oxide film 8 is formed on a surface of the support part 10, and a dielectric layer 4, an upper electrode 6, and a first external electrode 18 are provided on the oxide film 8 in this order.

Figure 11:
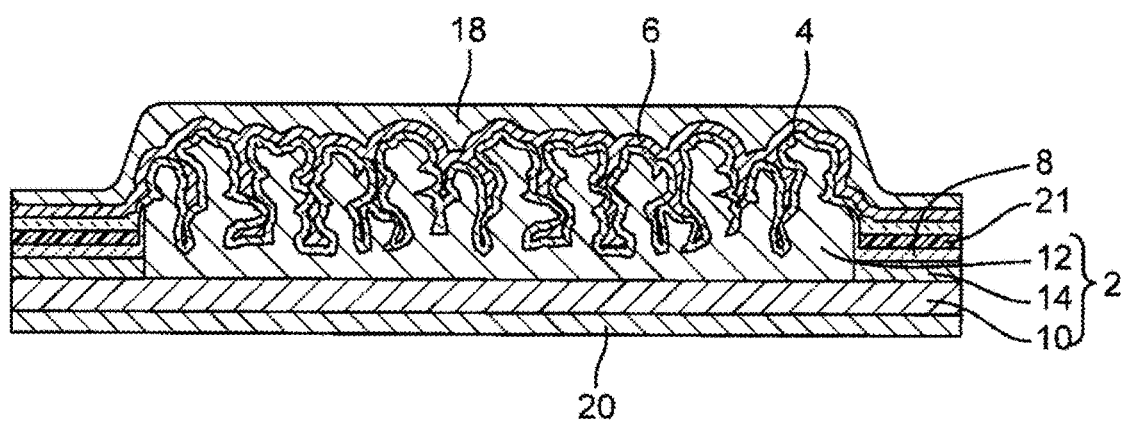
FIG. 11 is a schematic cross-sectional view of a capacitor according to another embodiment of the present invention.

In another aspect, the capacitor according to the present invention may have another insulating layer 21 between an oxide film 8 and a dielectric layer 4 (FIG. 11) or between a dielectric layer and an upper electrode.

The material that forms the insulating layer is not particularly limited as long as it is insulative, but it is preferably a heat-resistant resin. The insulating material that forms the insulating layer is preferably any of various types of glass materials, ceramic materials, polyimide resins, and fluororesins.

The thickness of the insulating layer is not particularly limited, but may be preferably 1 μm or more, for example, 3 μm or more or 5 μm or more, and may be preferably 100 μm or less, for example, 50 μm or less, preferably 20 μm or less, more preferably 10 μm or less. It is to be noted that the thickness of the insulating layer refers to the thickness at an end of the capacitor.

In addition, the capacitor may have, between the layers, a layer for enhancing the adhesion between the layers, a buffer layer for preventing the diffusion of components between the layers, or the like. In addition, the capacitor may have, on a side surface or the like thereof, a protective layer.

Further, the capacitor 1 according to the above-mentioned embodiment has the upper electrode and the external electrodes that reach the edges of the capacitor, but the present invention is not limited thereto. In one aspect, the upper electrode (preferably, the upper electrode and the first external electrode) is disposed away from the edges of the capacitor. This disposition can prevent end surface discharge. More specifically, the upper electrode does not have to be formed to cover all of the porous part, and may be formed to cover only the high-porosity part.

A process for manufacturing the capacitor 1 according to the above-mentioned embodiment will be specifically described below with reference to the drawings. It is to be noted that as for FIGS. 3(*a*) to 9(*b*), FIGS. 3(*a*), 4(*a*), 5(*a*), 6(*a*), 7(*a*), 8(*a*), and 9(*a*) each schematically show a perspective view of a collective board of capacitor elements, and FIGS. 3(*b*), 4(*b*), 5(*b*), 6(*b*), 7(*b*), 8(*b*), and 9(*b*) each schematically show a cross-sectional view of the collective board taken along the line x-x.

Figure 3A:
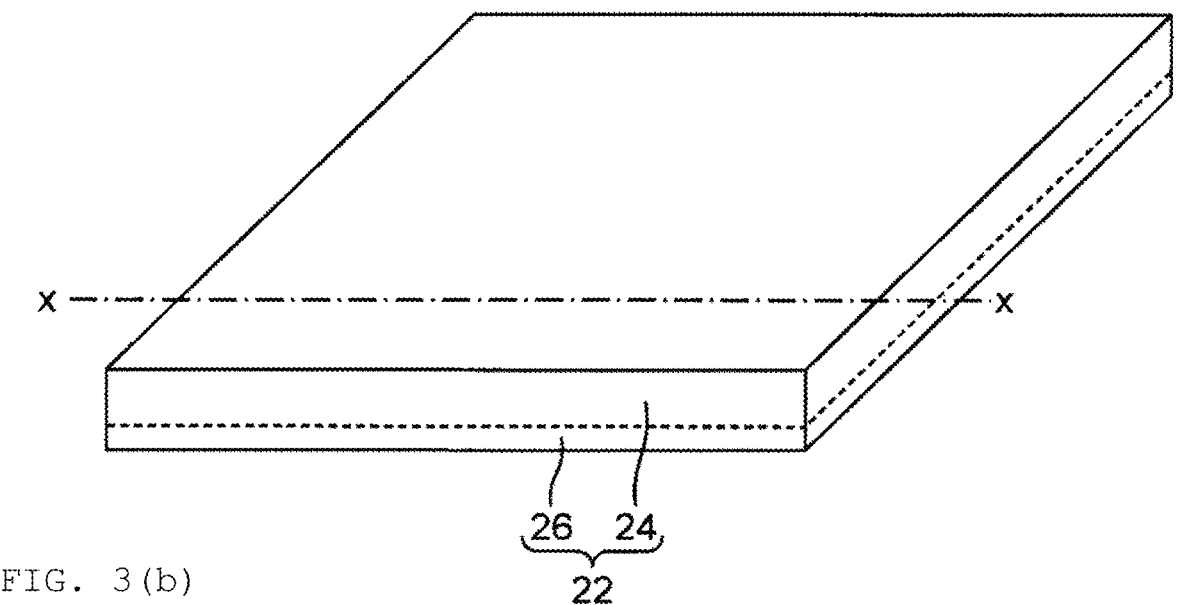
FIGS. 3(a) and 3(b) are diagrams for explaining a method for manufacturing the capacitor 1 shown in FIG. 1(a).
Figure 3B:
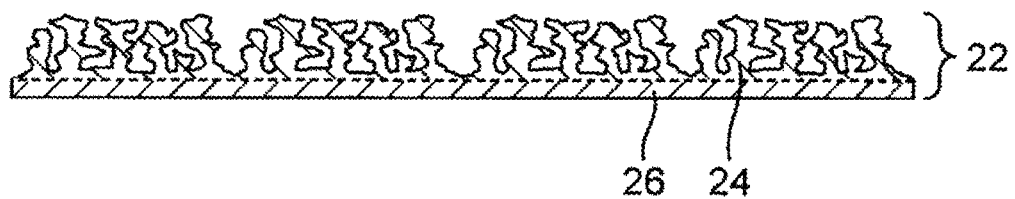

As shown in FIGS. 3(a) and 3(b), first, a conductive metal substrate 22 is prepared. The conductive metal substrate 22 has a porous metal layer 24 on one principal surface side thereof, and a support layer 26 on the other principal surface side thereof. More specifically, one principal surface of the conductive metal substrate 22 is composed of the porous metal layer 24, and the other principal surface of the conductive metal substrate 22 is composed of the support layer 26. The porosity of the porous metal layer 24 is higher than the porosity of the support layer 26.

Figure 4A:
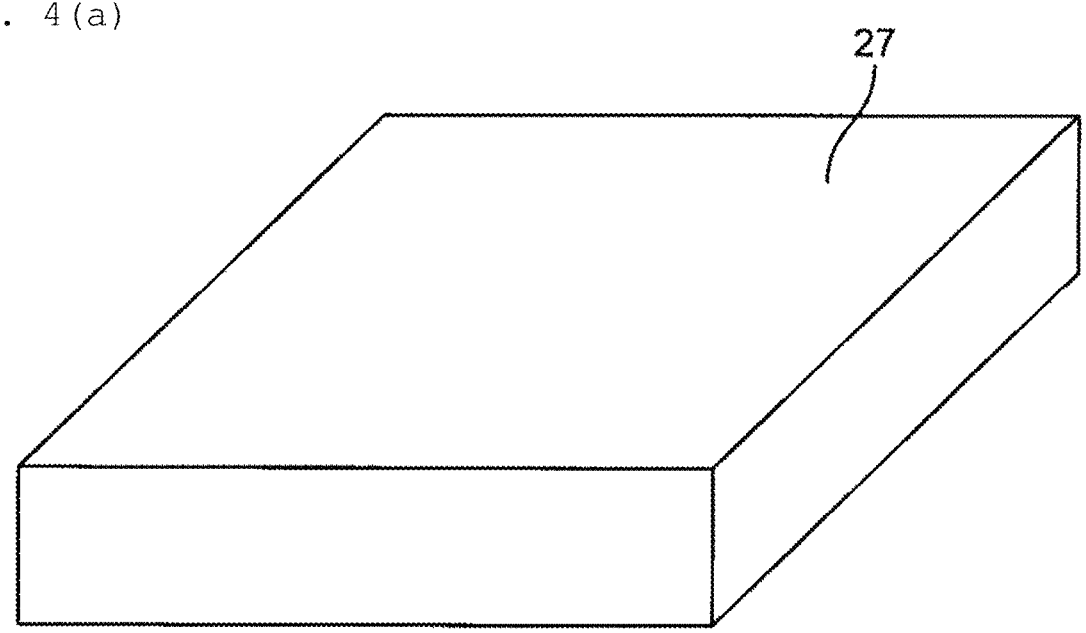
FIGS. 4(a) and 4(b) are diagrams for explaining a step following FIGS. 3(a) and 3(b).
Figure 4B:
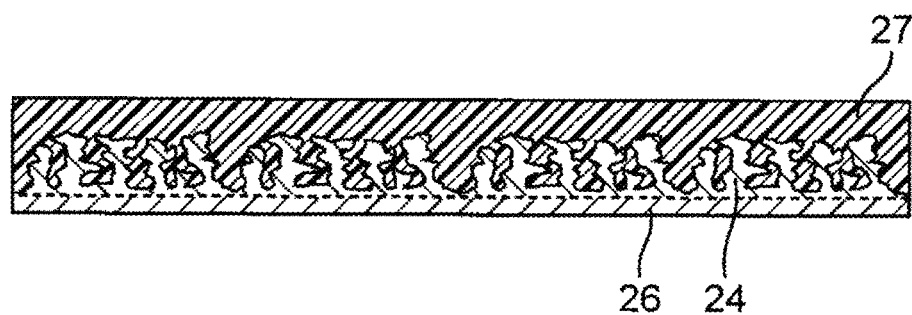

Next, as shown in FIGS. 4(a) and 4(b), on the principal surface of the conductive metal substrate 22 on a side where the porous metal layer 24 is present, a resist 27 is formed. The resist may be preferably a photosensitive resist (for example, a phenolic resist).

Figure 5A:
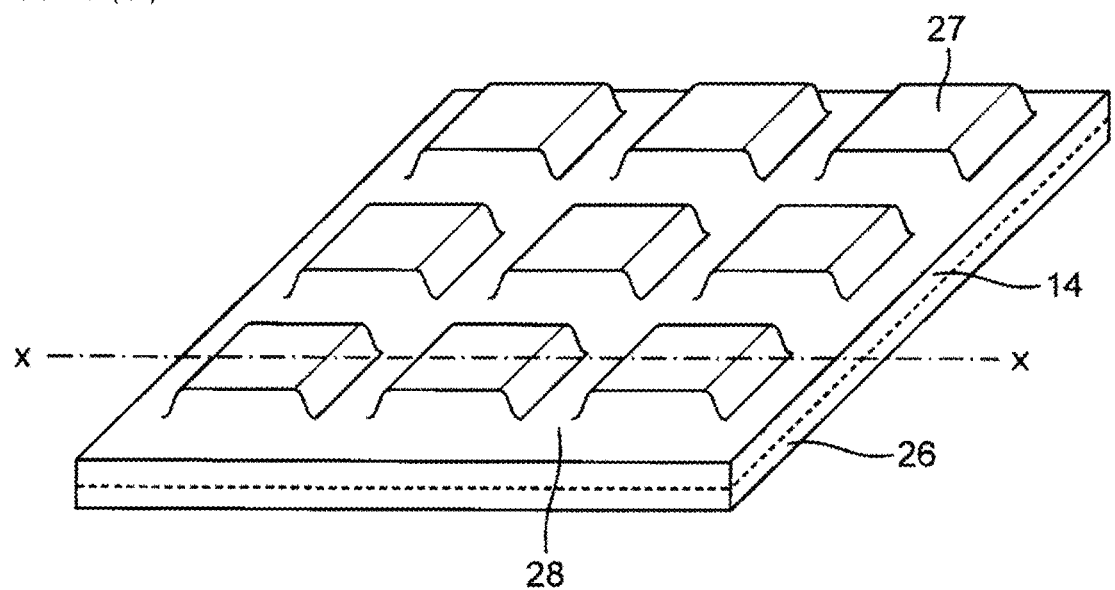
FIGS. 5(a) and 5(b) are diagrams for explaining a step following FIGS. 4(a) and 4(b).
Figure 5B:
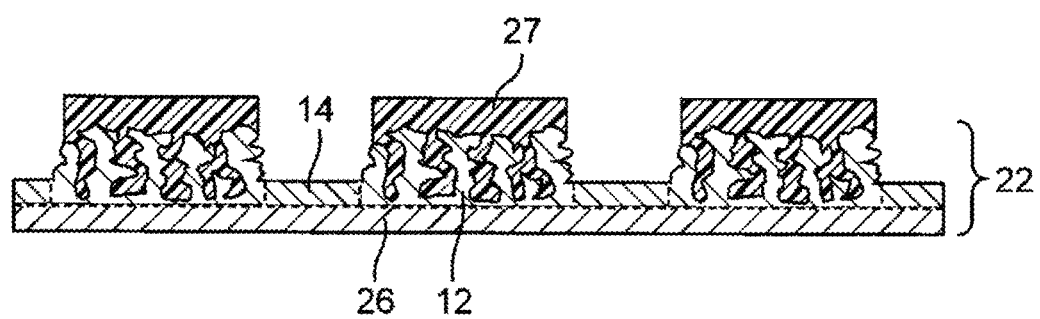

Next, as shown in FIGS. 5(a) and 5(b), pores in some regions of the porous metal layer 24 are collapsed and the resist in the regions are also removed to form a groove 28, and thus divide the porous metal layer. The divided porous metal layer corresponds to high-porosity parts 12. The groove is formed between the high-porosity parts 12, and the bottom surface of the groove is composed of a low-porosity part 14 formed by collapsing the porous metal layer 24. The groove 28 can be formed by the method described above as a method for collapsing the pores, preferably by a method of melting the metal with a laser or the like to collapse the pores. Alternatively, according to another aspect, in the case of forming the groove by partially removing the porous metal layer 24, methods of removal with a dicer, a laser, or the like can be used.

Figure 6A:
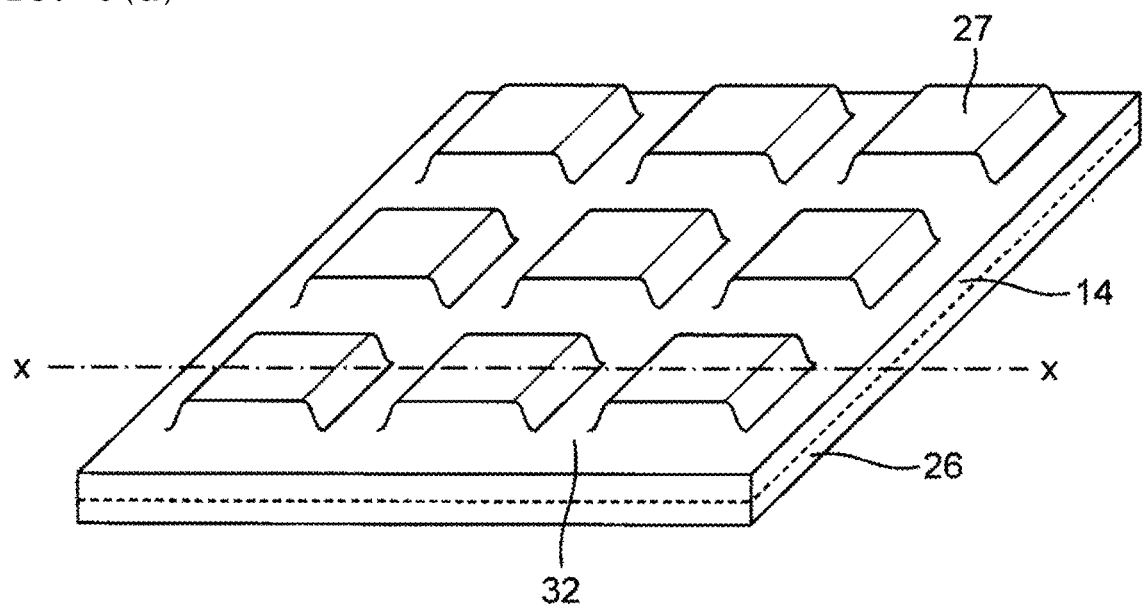
FIGS. 6(a) and 6(b) are diagrams for explaining a step following FIGS. 5(a) and 5(b).
Figure 6B:
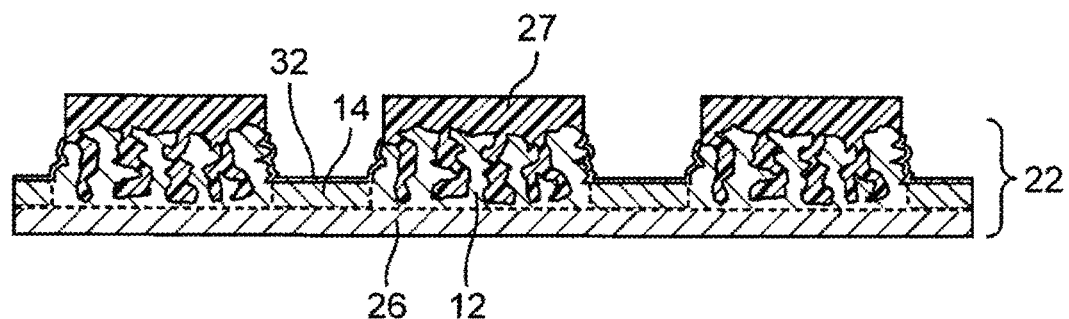

Next, as shown in FIGS. 6(a) and 6(b), the exposed portion of the conductive metal base material is oxidized to form an oxide film 32. The oxide film 32 is preferably formed by anodization.

Figure 7A:
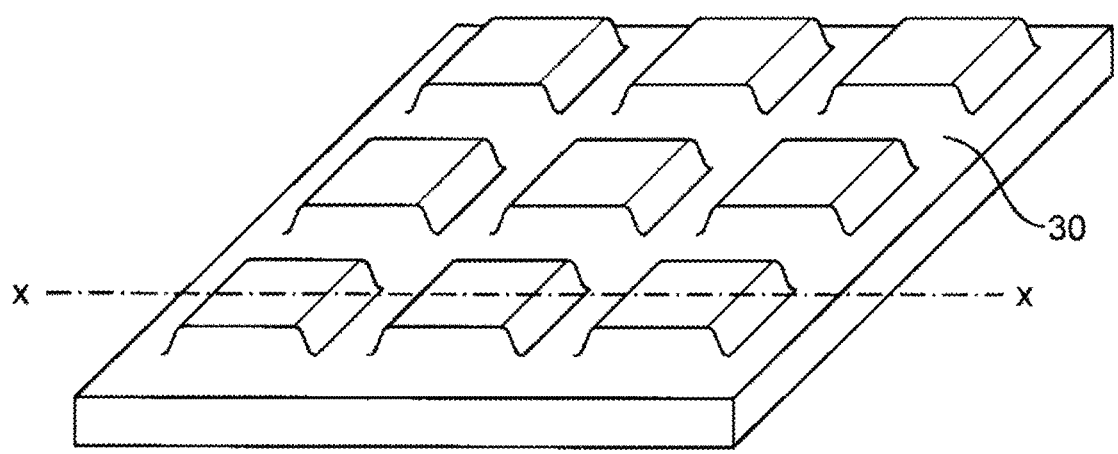
FIGS. 7(a) and 7(b) are diagrams for explaining a step following FIGS. 6(a) and 6(b).
Figure 7B:
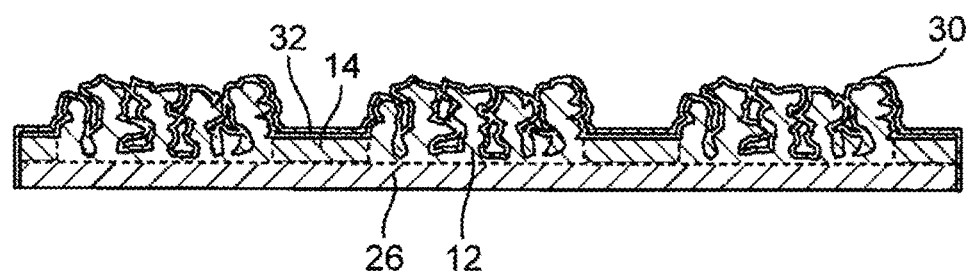

Next, as shown in FIGS. 7(a) and 7(b), a dielectric layer 30 is formed on the entire substrate obtained as described above. The dielectric layer 30 can be formed by the above-mentioned method for forming a dielectric layer, preferably by a gas-phase method, for example, an ALD method.

Figure 8A:
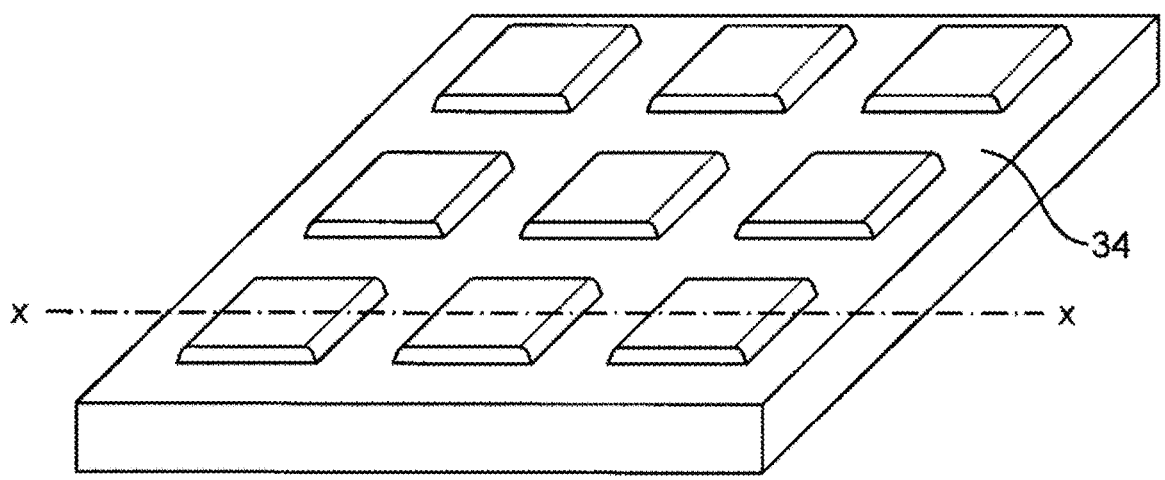
FIGS. 8(a) and 8(b) are diagrams for explaining a step following FIGS. 7(a) and 7(b).
Figure 8B:
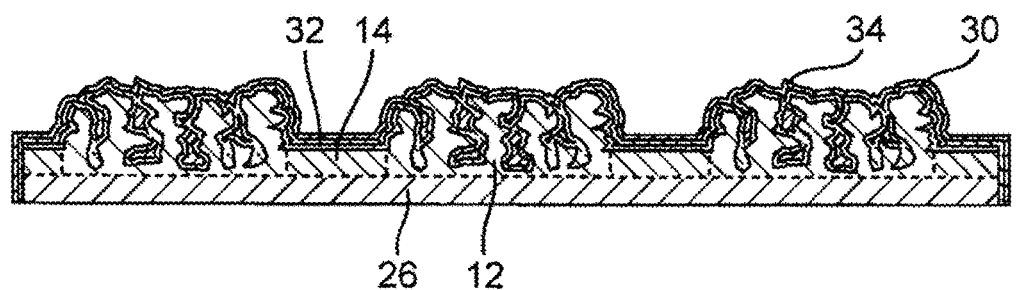

Next, as shown in FIGS. 8(a) and 8(b), an upper electrode 34 is formed on the entire substrate obtained as described above. The upper electrode 34 can be formed by the above-mentioned method for forming an upper electrode, preferably by a gas-phase method, for example, an ALD method.

Figure 9A:
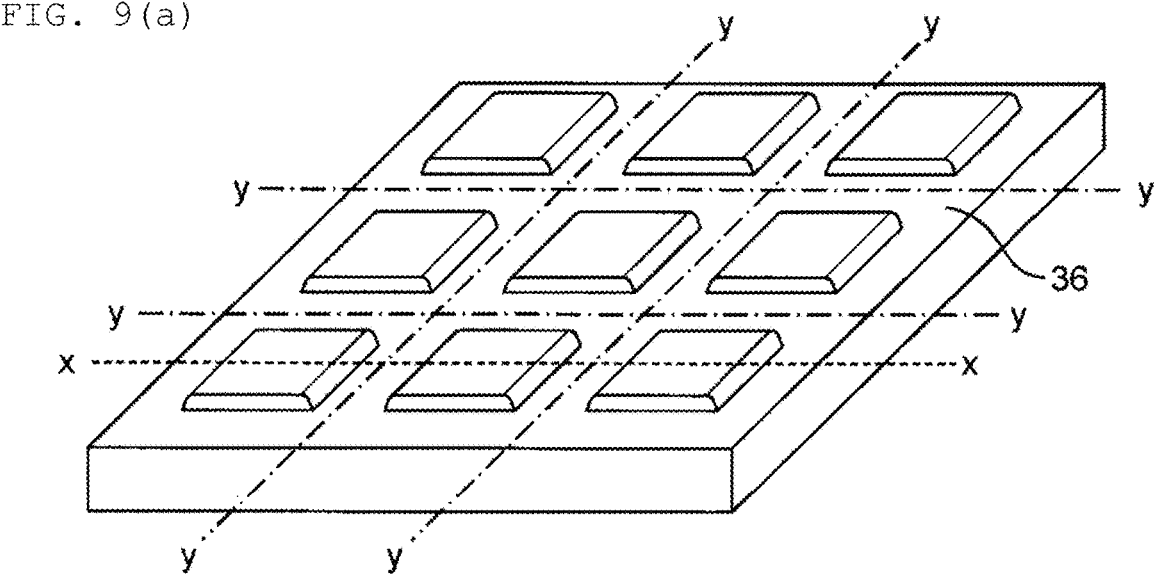
FIGS. 9(a) and 9(b) are diagrams for explaining a step following FIGS. 8(a) and 8(b).
Figure 9B:
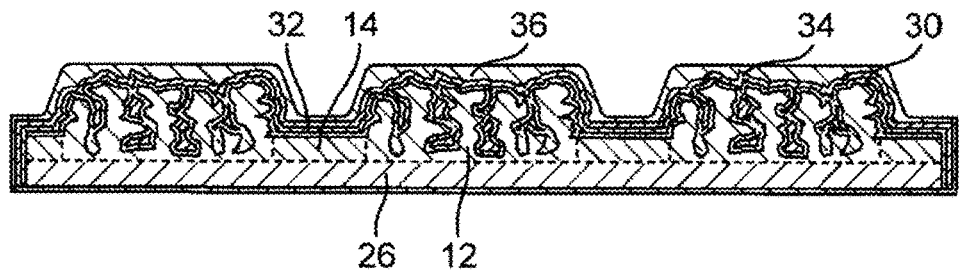

Next, as shown in FIGS. 9(a) and 9(b), an external electrode 36 is formed on the entire substrate obtained as described above. The external electrode 36 can be formed by the above-mentioned method for forming an external electrode, preferably by a sputtering method, vapor deposition, electrolytic plating, electroless plating, or the like.

The substrate obtained as described above is cut along the lines y-y shown in FIG. 9(a) to produce the capacitor according to the present invention. The cutting method is not particularly limited, but the substrate can be cut, for example, by a single method or a combination of cutting with a laser, punching through a mold, and cutting with a dicer, a carbide blade, a slitter, or a pinnacle blade. It is to be noted that the cutting divides the external electrode 36 to form a first external electrode and a second external electrode.

It is to be noted that the external electrode is an optional element in the capacitor according to the present invention, and thus, when the capacitor does not include an external electrode, the method for manufacturing the capacitor according to the present invention does not include, of course, the step of forming the external electrode.

While the capacitor and a method for manufacturing the capacitor according to the present invention have been described with reference to the capacitor 1 according to the above-mentioned embodiment, the present invention is not to be considered limited to the capacitor or manufacturing method, and various modifications can be made thereto.

EXAMPLES

Example 1

As a conductive metal substrate, an etched aluminum foil piece having a thickness of 53 μm and having, only in one surface, pores (having a pore diameter of 100 nm) to a depth of 28 μm was prepared (corresponding to FIGS. 3(a) and 3(b)).

Next, a phenolic photosensitive resist was applied to the porous surface of the conductive metal substrate, and the resist was exposed to light to be cured (corresponding to FIGS. 4(a) and 4(b)).

Next, a groove serving as a low-porosity part was formed in a grid pattern with a picosecond pulse fiber laser device to expose the conductive metal base material in the groove (corresponding to FIGS. 5(a) and 5(b)).

Next, the conductive metal base material was subjected to anodization at 12 V for 30 minutes using a 20% aqueous sulfuric acid solution to form an oxide film on the exposed portion of the conductive metal base material (corresponding to FIGS. 6(a) and 6(b)). The oxide film was subjected to sealing treatment in boiling water for 10 minutes.

Next, an AlOx film having a thickness of 30 nm was formed by an atomic layer deposition method to form a dielectric layer (corresponding to FIGS. 7(a) and 7(b)). Further, a ruthenium film having a thickness of 50 nm was formed by an atomic layer deposition method to form an upper electrode (corresponding to FIGS. 8(a) and 8(b)). Further, a Ti film having a thickness of 100 nm and a Cu film having a thickness of 500 nm were formed by sputtering, and finally, a Cu film having a thickness of 8 μm was formed by plating to form an external electrode (corresponding to FIGS. 9(a) and 9(b)).

The obtained substrate as a collective board with a plurality of capacitors was cut at the middle of the groove (corresponding to the lines y-y in FIG. 9(a)) with use of a picosecond pulse fiber laser device to produce capacitors of Example 1 as shown in FIGS. 1(a) and 1(b).

Comparative Example 1

Capacitors of Comparative Example 1 were obtained in the same manner as in Example 1 except that a polyimide resin was applied to the groove using an air dispenser instead of forming an oxide film by anodization.

Evaluation

Cross-Sectional Observation

The capacitors obtained in Example 1 and Comparative Example 1 were subjected to cross-sectional observation by embedding resin polishing, and the presence or absence of separation between the conductive metal base material and the insulating layer (anodized film or polyimide layer) and the minimum film thickness were determined by observation using an optical microscope at a magnification of 1000×. The results are shown in Table 1 below.

Strength Test

A pressure of 1 N/m² was applied to a principal surface of each capacitor on the upper electrode side thereof toward a principal surface thereof on the lower electrode side thereof, then a current-voltage curve was obtained, and samples in which a current of 50 mA or more flowed at a low voltage of 40 V or less were counted as short-circuited samples and regarded as the number of short circuits. The results are shown in Table 1 below.

TABLE 1

|  | Example 1 | Comparative Example 1 |
|---|---|---|
| Number of separated insulating layers | 0/20 | 5/20 |
| Minimum film thickness | 11 μm | 5 μm |
| Maximum film thickness | 12 μm | 10 μm |
| Number of short circuits | 0/20 | 6/20 |

From the above-mentioned results, it was confirmed that in the capacitor according to the present invention, the insulating layer is less susceptible to separation, and the adhesion between the layers is high. It was also confirmed that in the capacitor according to the present invention, the difference between the minimum film thickness and the maximum film thickness of the insulating layer is small, and the capacitor can have a uniform layer. Further, it was also confirmed that the capacitor according to the present invention is less susceptible to a short circuit.

The capacitor according to the present invention is remarkably stable and highly reliable, and thus is suitably used in various electronic devices.

DESCRIPTION OF REFERENCE SYMBOLS

1: Capacitor
2: Conductive metal base material
4: Dielectric layer
6: Upper electrode
8: Oxide film
10: Support part
12: High-porosity part
14: Low-porosity part
18: First external electrode
20: Second external electrode
21: Insulating layer
22: Conductive metal substrate
24: Porous metal layer
26: Support layer
27: Resist
28: Groove
30: Dielectric layer
32: Oxide film
34: Upper electrode
36: External electrode

The invention claimed is:

1. A capacitor comprising:
   a conductive metal base material having a porous part and a surface;
   an oxide film on the surface of the conductive metal base material;
   a dielectric layer on the porous part and covering the oxide film; and
   an upper electrode on the dielectric layer,
   wherein a total thickness of the dielectric layer and the oxide film at a portion where the dielectric layer covers the oxide film is larger than a total thickness of the dielectric layer and the oxide film at a central portion of the porous part.

2. The capacitor according to claim 1, wherein the oxide film is on an end of the surface of the conductive metal base material.

3. The capacitor according to claim 2, wherein the end of the surface of the conductive metal base material is a region that occupies 1% to 30% of a distance between a pair of sides of the conductive metal base material opposed to each other.

4. The capacitor according to claim 2, wherein the end of the surface of the conductive metal base material is a region that occupies 3 μm or more of a distance from an edge of the surface of the conductive metal base material.

5. The capacitor according to claim 2, wherein the oxide film extends onto a wall of a groove of the porous part.

6. The capacitor according to claim 1, wherein the oxide film is an anodized film of the conductive metal base material.

7. The capacitor according to claim 6, wherein the anodized film is selected from $AlO_x$, $TaO_x$, $TiO_x$, $NbO_x$, $ZrO_x$, $WO_x$, $AlTiO_x$, $TiZrO_x$, and $TiZrWO_x$, where x is any value larger than 0.

8. The capacitor according to claim 1, wherein the conductive metal base material comprises a high-porosity part that defines the porous part and a low-porosity part that surrounds at least two sides of the high-porosity part, and the oxide film is on at least the low-porosity part.

9. The capacitor according to claim 8, wherein the low-porosity part completely surrounds the high-porosity part.

10. The capacitor according to claim 8, wherein a porosity of the high-porosity part is 20% to 90%.

11. The capacitor according to claim 1, wherein the dielectric layer contains a substance having a source different from a source of the conductive metal base material.

12. The capacitor according to claim 1, wherein the oxide film has a thickness of 8 μm or more.

13. The capacitor according to claim 1, wherein the oxide film has a thickness of 8 μm to 100 μm.

14. The capacitor according to claim 1, wherein the oxide film extends onto a wall of a groove of the porous part.

15. The capacitor according to claim 1, wherein dielectric layer is directly on the oxide film.

16. The capacitor according to claim 1, further comprising an insulating layer on the oxide film.

17. The capacitor according to claim 16, wherein the insulating layer is between the oxide film and the dielectric layer.

18. The capacitor according to claim 1, wherein the conductive metal base material contains a material selected from aluminum, tantalum, titanium, niobium, zirconium, tungsten, or an alloy thereof.

* * * * *